US009778341B2

(12) United States Patent
Banerjee et al.

(10) Patent No.: US 9,778,341 B2
(45) Date of Patent: Oct. 3, 2017

(54) AUTOMATIC INDOOR PARKING SYSTEM USING COLLABORATIVE SMARTPHONE SENSING

(71) Applicant: International Business Machines Corporation, Armonk, NY (US)

(72) Inventors: Dipyaman Banerjee, New Delhi (IN); Sonia Soubam, Imphal (IN)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 14/834,652

(22) Filed: Aug. 25, 2015

(65) Prior Publication Data

US 2017/0061795 A1 Mar. 2, 2017

(51) Int. Cl.
*G08G 1/00* (2006.01)
*G01S 5/02* (2010.01)
*G08G 1/14* (2006.01)

(52) U.S. Cl.
CPC ................ *G01S 5/02* (2013.01); *G08G 1/144* (2013.01); *G08G 1/146* (2013.01)

(58) Field of Classification Search
CPC .......... G08G 1/148; G08G 1/14; G08G 1/142; G08G 1/143; G08G 1/144
USPC ....................... 340/932.2, 933, 938; 701/454
See application file for complete search history.

(56) References Cited

U.S. PATENT DOCUMENTS 8,816,880 B1 * 8/2014 Foster .................... G08G 1/146 340/932.2
8,972,178 B2 * 3/2015 Windeler .............. G08G 1/144 701/454
8,976,063 B1 3/2015 Hawkins et al.
9,299,256 B2 * 3/2016 Chen ...................... G08G 1/141
9,418,552 B2 * 8/2016 Korman ................. G08G 1/143
9,418,553 B2 * 8/2016 Nakhjavani ............ G08G 1/144
9,449,512 B2 * 9/2016 Zafiroglu .............. G08G 1/065
2013/0335239 A1 12/2013 Levy et al.
2014/0122190 A1 * 5/2014 Wolfson ............ G06Q 10/0631 705/13

OTHER PUBLICATIONS

Tang, Vanessa W.S., et al., "An Intelligent Car Park Management System based on Wireless Sensor Networks", 1st International Symposium on Pervasive Computing and Applications, Aug. 3-5, 2006, Urumqi, China, 6 pages, IEEE Digital Library.

(Continued)

*Primary Examiner* — Toan N Pham
(74) *Attorney, Agent, or Firm* — Ference & Associates LLC

(57) ABSTRACT

Methods and arrangements for tracking within a parking facility. A module of a mobile device is used to communicate, to a parking server which stores global data relative to parking places in a parking facility, the presence of a vehicle in the parking facility. There is received, via the module, an indication from the parking server of one or more occupied and/or unoccupied parking places in the parking facility. The module is used to detect a parking event of the vehicle relative to one of the one or more occupied and/or unoccupied parking places, and to report the parking event to the parking server. Other variants and embodiments are broadly contemplated herein.

20 Claims, 4 Drawing Sheets

(56) References Cited

OTHER PUBLICATIONS

Liu, Jingbin, et al., "iParking: An Intelligent Indoor Location-Based Smartphone Parking Service", 2012, 18 pages, Sensors (Open Access), www.mdpi.com/journal/sensors.

Nawaz, Sarfraz, et al., "ParkSense: A Smartphone Based Sensing System for On-Street Parking", MobiCom '13, Sep. 30-Oct. 4, 2013, Miami, Florida, USA, 12 pages, ACM Digital Library.

Lan, Kun-Chan, et al., "An intelligent driver location system for smart parking", Expert Systems with Applications, 14 pages, Elsevier, www.elsevier.com/locate/eswa.

Mathur, Suhas, et al., "ParkNet: A Mobile Sensor Network for Harvesting Real Time Vehicular Parking Information", MobiHoc S3 '09, May 18, 2009, New Orleans, Louisiana, USA, 3 pages, ACM Digital Library.

* cited by examiner

AUTOMATIC INDOOR PARKING SYSTEM USING COLLABORATIVE SMARTPHONE SENSING

BACKGROUND

Indoor parking facilities present unique challenges for customers, while managers of such facilities typically wish to maximize utilized capacity while ensuring efficient turnover of spaces. Thus, among other things, it is helpful from both perspectives for a customer to quickly and efficiently find an empty parking spot and to easily determine where he/she left the parked vehicle upon his/her return to the facility. Additionally, it is helpful for the manager to glean other information such as determining how many empty parking spots there may exist at any given time in the facility, where such empty spots are located, and which if any spots may be occupied for an unusually long time.

BRIEF SUMMARY

In summary, one aspect of the invention provides a method of tracking parking events within a parking facility, the method comprising: utilizing at least one processor to execute computer code that performs the steps of: using a module of a mobile device to communicate, to a parking server which stores global data relative to parking places in a parking facility, the presence of a vehicle in the parking facility; receiving, via the module, an indication from the parking server of one or more occupied and/or unoccupied parking places in the parking facility; using the module to detect a parking event of the vehicle relative to one of the one or more occupied and/or unoccupied parking places; and using the module to report the parking event to the parking server.

Another aspect of the invention provides an apparatus for parking events within a parking facility, the apparatus comprising: at least one processor; and a computer readable storage medium having computer readable program code embodied therewith and executable by the at least one processor, the computer readable program code comprising: computer readable program code configured to use a module of a mobile device to communicate, to a parking server which stores global data relative to parking places in a parking facility, the presence of a vehicle in the parking facility; computer readable program code configured to receive, via the module, an indication from the parking server of one or more occupied and/or unoccupied parking places in the parking facility; computer readable program code configured to use the module to detect a parking event of the vehicle relative to one of the one or more occupied and/or unoccupied parking places; and computer readable program code configured to use the module to report the parking event to the parking server.

A further aspect of the invention provides a computer program product for parking events within a parking facility, the computer program product comprising: a computer readable storage medium having computer readable program code embodied therewith, the computer readable program code comprising: computer readable program code configured to use a module of a mobile device to communicate, to a parking server which stores global data relative to parking places in a parking facility, the presence of a vehicle in the parking facility; computer readable program code configured to receive, via the module, an indication from the parking server of one or more occupied and/or unoccupied parking places in the parking facility; computer readable program code configured to use the module to detect a parking event of the vehicle relative to one of the one or more occupied and/or unoccupied parking places; and computer readable program code configured to use the module to report the parking event to the parking server.

An additional aspect of the invention provides a method comprising: receiving, at a parking server which stores global data relative to parking places in a parking facility, a communication from a mobile device to indicate presence of a vehicle in a parking facility, the module comprising an application installed at the mobile device; communicating, to the mobile device, an indication of one or more occupied and/or unoccupied spaces in the parking facility; receiving, from the mobile device, data relative to detected parking events at one or more computed locations of the vehicle within the parking facility, via: receiving a communication, from the mobile device, relative to a detected transition between driving of the vehicle and ambulatory motion of a user of the mobile device; and receiving a communication, from the mobile device, relative to a detected transition between ambulatory motion of the user of the mobile device and driving of the vehicle.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
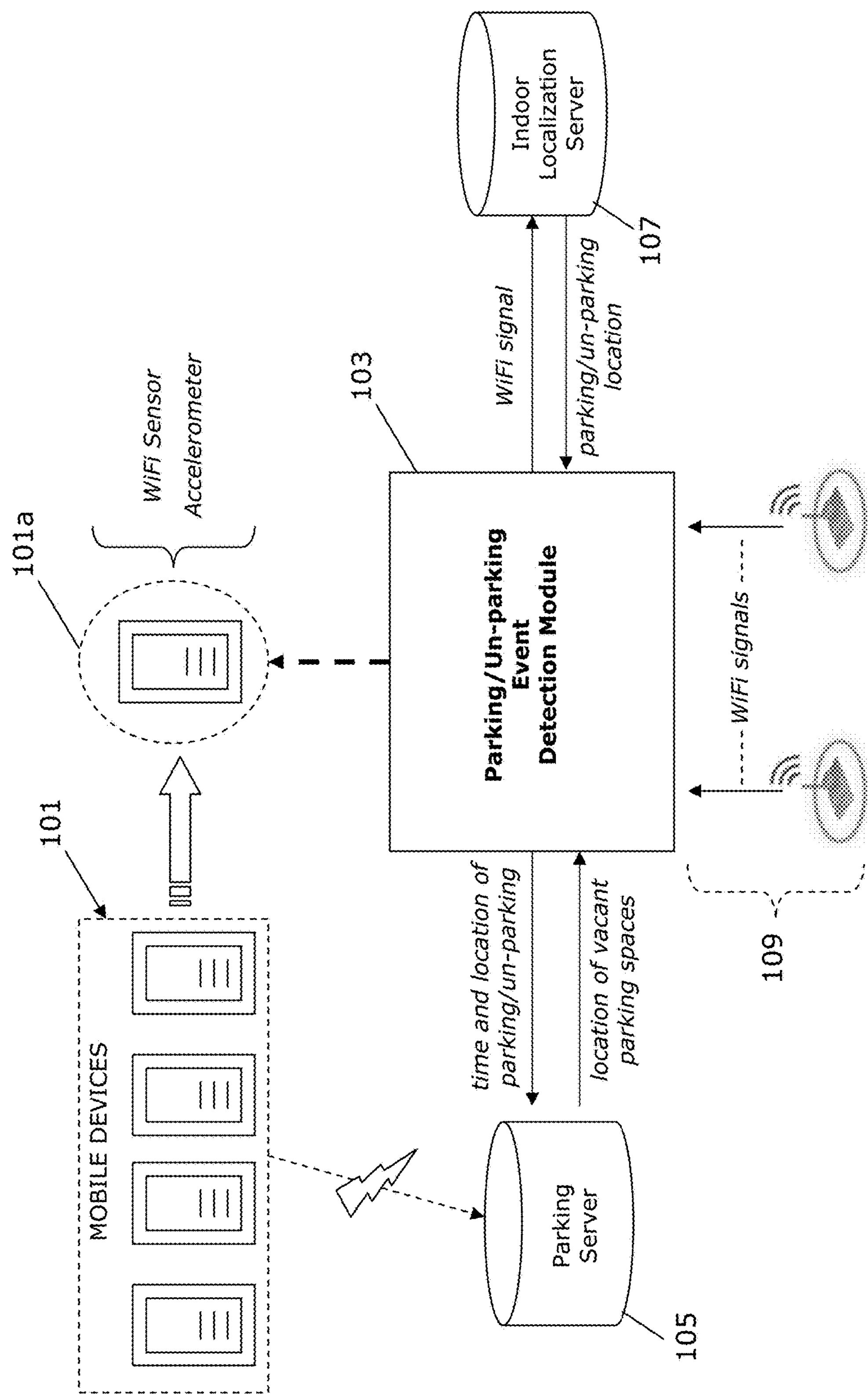
FIG. 1 schematically illustrates a system architecture, in accordance with at least one embodiment of the invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIGS. 1 and 2. It should be appreciated that the processes, arrangements and products broadly illustrated therein can be carried out on, or in accordance with, essentially any suitable computer system (including smartphones, tablets, etc.) or set of computer systems, which may, by way of an illustrative and non-restrictive example, include a system or server such as that indicated at 12' in FIG. 4. In accordance with an exemplary embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, are methods and arrangements which permit: automatically finding empty parking spaces in an indoor parking place in real time without any input from the user and irrespective of a smartphone position or orientation; and/or automatically retracing parked vehicles in an indoor parking place. This may involve detecting and localizing parking (or un-parking) events in real time in an indoor parking place using sensing data from smartphone sensors. There can also be involved an automatic detection of user micro-states (e.g., walking, driving, still, unknown) in real time in an indoor parking place using accelerometer and WiFi sensing data from a smartphone.

Further, there is broadly contemplated herein a system and method to automatically detect user macro states (e.g., "in-vehicle" or "out-of-vehicle") in real time (e.g., on a continual, ongoing basis without a delay) in an indoor parking place from a given history of micro states. This can involve automatically detecting a transition between user macro states in real time in an indoor parking place. There may also be involved the sharing of individual vehicle parking and un-parking locations among multiple users, while preserving the users' privacy.

The features discussed above, and others, relating to at least one embodiment of the invention, will be better appreciated from the discussion which follows.

In accordance with at least one embodiment of the invention, collaborative smartphone sensing may be employed in order to address typical challenges faced in parking facility management, and to assist or enhance the general customer experience as well. Towards that end, it is helpful to accurately detect transitions between "walk" and "drive" states of one or more customers on an ongoing basis.

As such, there is broadly contemplated herein, in accordance with at least one embodiment of the invention, a smartphone-based parking system which can assist customers in finding a parking spot in real time in an indoor parking facility. This can also help customers retrace back to their parked vehicle in the same facility. Administrators or managers can monitor occupancy status of parking spaces in the facility in real time. In accordance with arrangements as broadly contemplated herein, additional infrastructure such as sensors are not required; the associated system works completely automatically without the need for customer input, and works accurately regardless of any customer's smartphone position or orientation.

In accordance with a general background relative to at least one embodiment of the invention, it can be appreciated that several actions on the part of a customer may be involved in parking or "un-parking" (i.e., driving away from a parking spot) of a vehicle. Typically, a customer drives into the facility, parks the vehicle, then walks away of his/her own accord. When returning to the facility to retrieve his/her vehicle, the customer typically walks back to the space, un-parks the vehicle and drives away. As broadly contemplated herein, various arrangements and methods in accordance with at least one embodiment of the invention are helpful in accurately detecting transitions between walk and drive states of a user in real time.

As such, in accordance with at least one embodiment of the invention, to detect and localize a parking event in real time, smartphone sensors are used to detect when a customer does make a transition from a drive state to a walk state, as alluded to hereabove. To this end, an indoor localization technique may be employed, e.g., using WiFi signals received by a customer smartphone at the time of transition, to determine the location of the parked vehicle. To detect and localize an un-parking event in real time, smartphone sensors may similarly be used to detect a transition from a walk state to a drive state. Also, an indoor localization technique may be employed to determine the location of the un-parked vehicle. The time and location of vehicle un-parking may be shared with other users, or with the facility managers, through a suitable arrangement such as a cloud-hosted server.

Generally, several challenges present themselves in a context in which at least one embodiment of the invention may be employed. For instance, owing to an absence of GPS signals indoors, such signals cannot be used in determining a customer's state, let alone vehicle speed or trajectory. Also, with low vehicle speeds in play as compared to normal driving, it may be difficult to distinguish between driving states and non-driving states. With intermittent stops involved in a typical indoor environment, a high rate of "false positives" is conceivable in detecting a driving or walking state.

FIG. 1 schematically illustrates a general system architecture, in accordance with at least one embodiment of the invention. Customer mobile devices 101 (e.g., smartphones) will help in the detection of parking and un-parking events in a manner to be more fully appreciated below. As shown with respect to a sample smartphone 101*a*, including a WiFi sensor and accelerometer, a (parking/un-parking) event detection module 103 may be installed on the smartphone 101*a* (e.g., in the form of an downloadable application or "app".) This module is in communication with a parking server 105 and an indoor localization server 107 which helps pinpoint the location of smartphone 101*a* within a parking facility. Signals from one or more WiFi sources (109) are sent out within the parking facility, and used in a manner described more fully below.

In accordance with at least one embodiment of the invention, for localization server 107, it should be understood and appreciated that essentially any suitable indoor localization arrangement or algorithm may be employed, which itself may make use of WiFi fingerprinting or localization. (For instance, the "BlueZen"™ Indoor Localization Application developed by International Business Machines [Armonk, N.Y.] may be employed, e.g., deployed on a cloud-hosted server.) Thus, WiFi localization information is collected from every parking spot a priori. WiFi signals (109) received at smartphone 101*a* (and others) at the time of parking/un-parking events (as detected by event detection module 103, discussed herebelow) are sent to the localization server 107. WiFi signals 109 are matched with the pre-collected fingerprints using a suitable technique (e.g., Bayesian inferencing technique) to infer the location of the event. The event location is then sent back to the customer smartphone (through event detection module 103), which is in turn updated to parking server 105.

Figure 2:
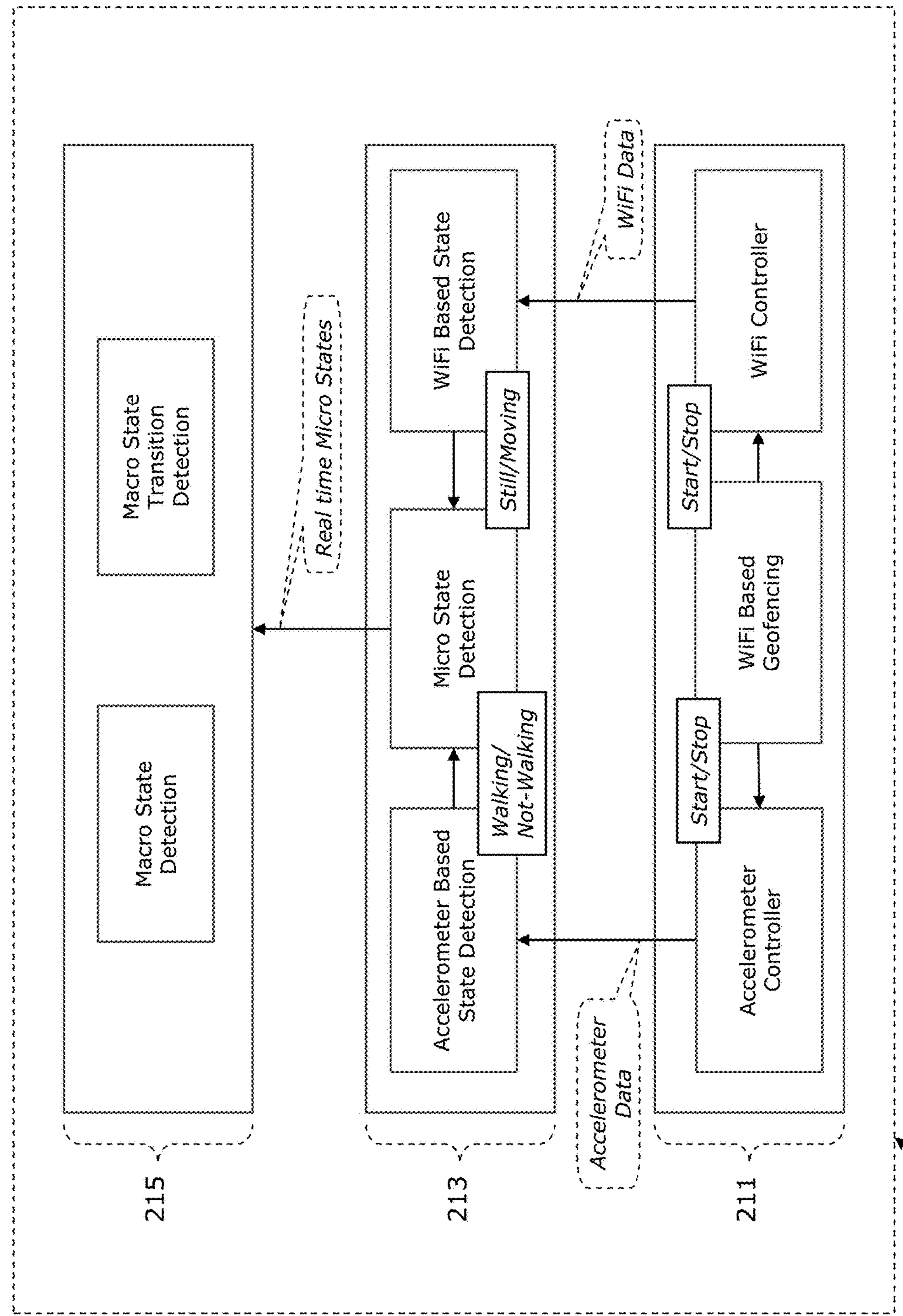
FIG. 2 schematically illustrates an event detection module for parking and un-parking, on a mobile device such as a smartphone, in accordance with at least one embodiment of the invention.

FIG. 2 schematically illustrates an event detection module 203 for parking and un-parking, on a mobile device such as a smartphone, in accordance with at least one embodiment of the invention. (Such a module may correspond to the event detection module 103 described and illustrated with respect to FIG. 1.) As such, in accordance with at least one embodiment of the invention, a smartphone sensing control layer 211 may include a WiFi controller, a geofencing module and an accelerometer controller. Start/stop events, indicating general translational motion of the associated smartphone, are communicated as shown to the accelerometer controller and WiFi controller. A micro-state detection layer 213 may include an accelerometer-based state detection module, a WiFi-based state detection module, and a micro-state detection module. Accordingly, accelerometer data and WiFi data are communicated from the smartphone sensing control layer 211 as shown. A state of "walking" or "not-walking", as well as a state of "still" or "moving" (all regarded as "micro states") are thus communicated as shown to the micro state detection module. Further, an event detection layer 215 may include a macro-state detection module and a macro-state transition detection module, based on information on real-time micro states communicated from the micro-state detection layer 213. The macro states thus determined are that of a parking or un-parking event; an indoor localization server (e.g., as indicated at 107 in FIG. 1) can then determine the location of parking or un-parking.

By way of further detail, in accordance with at least one embodiment of the invention, in the smartphone sensing control layer 211, the WiFi Controller: controls starting and stopping of WiFi signal scanning, controls a WiFi sampling frequency, and stores a time series of WiFi data for geofencing, micro state detection and indoor localization. The geofencing module, for its part: continuously matches WiFi signals to pre-collected WiFi fingerprints of the indoor area of the parking facility to determine if the user is inside or outside the facility; signals the accelerometer controller to start when the user is detected inside the indoor area, and signals the accelerometer controller to stop when the user is detected inside the indoor area. The accelerometer controller: controls starting and stopping of WiFi signal scanning, controls WiFi sampling frequency, and stores the time series of accelerometer data for micro state detection.

By way of further detail, in accordance with at least one embodiment of the invention, in the micro-state detection layer 213, the accelerometer based state detection module: detects in real time if the user is walking or not walking, using a suitable unsupervised online classifier. The WiFi based state detection module uses a detection of variation of WiFi signals to detect if the user is stationary or moving, and can (for example) evaluate a modified Jaccard Index metric in that connection; it also runs parallel and asynchronously with respect to the accelerometer based state detection module. The micro state detection module: time-synchronizes the accelerometer and WiFi states (which themselves are computed asynchronously), and then, by way of illustrative example, can use a rules table to combine the history of accelerometer and WiFi states and derive a current micro state in real time.

By way of further detail, in accordance with at least one embodiment of the invention, in the event detection layer 215, the macro state detection module can detect a driving (inside the vehicle) or walking (outside the vehicle) state via processing a time series of micro states (driving, walking, stationary, unknown). It can eliminate "noise" states, via any suitable arrangement, that may result, e.g., from a sudden movement of the mobile device, and can take into account any intermittent stops that may occur during driving or walking. The macro state transition detection module can serve to determine the time when a user makes a transition from one macro state to another; to this end, by way of example, it may utilize a suitable change point detection technique to detect the transition.

In accordance with at least one embodiment of the invention, and with continued reference to FIGS. 1 and 2 alike, a parking server (105) may represent a server to which a customer smartphone uploads (from event detection module 103/203) the time and location and individual parking and un-parking events. From parking server 105, customers and facility managers alike can download the state of the facility, showing which parking spots are occupied and which are vacant. Privacy may be preserved in that no customer information is saved; customers and managers alike need only know whether a space is occupied or vacant, but not by whom.

It can be appreciated from the foregoing that, in accordance with at least one embodiment of invention, a technical improvement is represented at least via provision of methods and arrangements which permit: automatically finding empty parking spaces in an indoor parking place in real time without any input from the user and irrespective of a smartphone position or orientation; and/or automatically retracing parked vehicles in an indoor parking place.

In accordance with at least one embodiment of the invention, very generally, quantitative values as determined herein, or other data or information as used or created herein, can be stored in memory or displayed to a user on a screen, as might fit the needs of one or more users.

Figure 3:
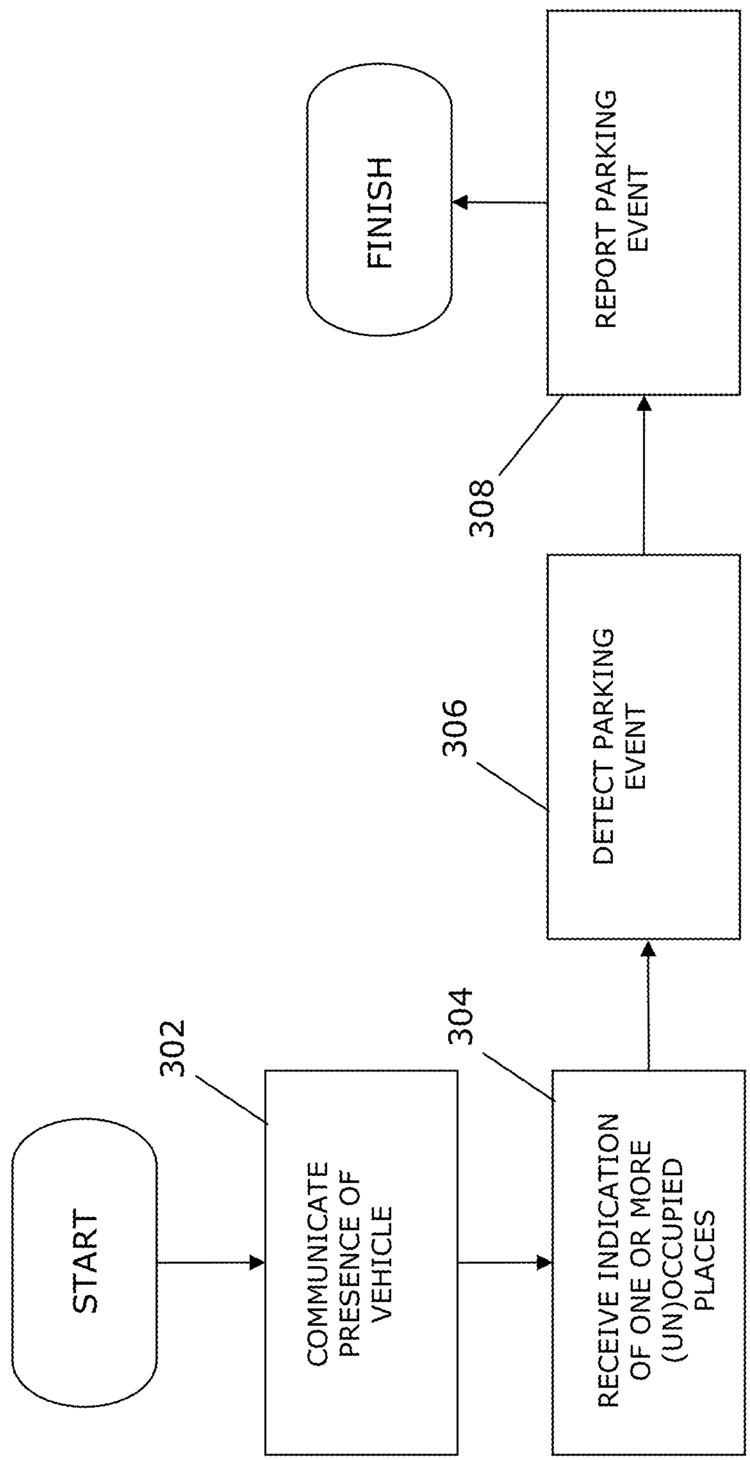
FIG. 3 sets forth a process more generally for tracking parking events within a parking facility.

FIG. 3 sets forth a process more generally for tracking parking events within a parking facility, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

Figure 4:
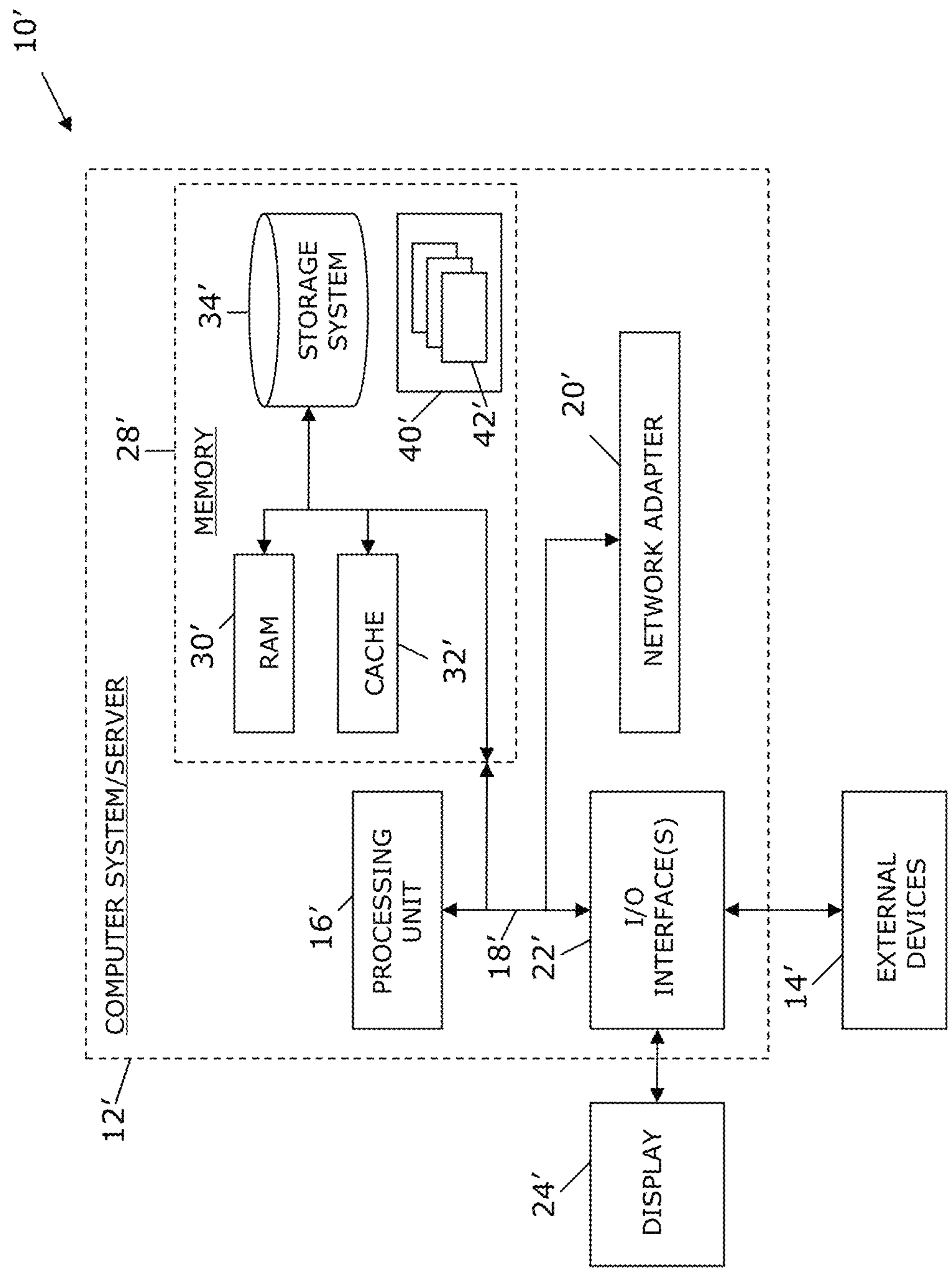
FIG. 4 illustrates a computer system.

As shown in FIG. 4, in accordance with at least one embodiment of the invention, a module of a mobile device is used to communicate, to a parking server which stores global data relative to parking places in a parking facility, the presence of a vehicle in the parking facility (302). There is received, via the module, an indication from the parking server of one or more occupied and/or unoccupied parking places in the parking facility (304). The module is used to detect a parking event of the vehicle relative to one of the one or more occupied and/or unoccupied parking places (306), and to report the parking event to the parking server (308).

It should be understood that essentially any suitable computing device may be employed in accordance with at least one embodiment of the invention. As such, mobile devices, including smart phones or other devices such as tablet computers, may easily incorporate arrangements such as those described and illustrated hereabove with respect to FIGS. 1 and 2. Merely by way of illustrative example, a computing node is discussed here below which may be employed in accordance with any suitable aspect of at least one embodiment of the invention. Further, a mobile device, as may be employed in accordance with at least one embodiment of the invention as broadly contemplated herein, could include components which function analogously to any and all of those discussed herebelow in connection with FIG. 4.

Referring now to FIG. 4, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of tracking parking events within an indoor parking facility, said method comprising:

utilizing at least one processor to execute computer code that performs the steps of:

using a module of a mobile device to communicate, to a parking server which stores global data relative to parking places in the indoor parking facility, a presence of a vehicle in the indoor parking facility;

receiving, via the module, an indication from the parking server of one or more occupied and/or unoccupied parking places in the indoor parking facility;

using the module to detect a parking event of the vehicle relative to one of the one or more occupied and/or unoccupied parking places, wherein said detecting of the parking event comprises detecting a transition between ambulatory motion of a user of the mobile device and driving of the vehicle via:

receiving and synchronizing:

accelerometer data of the mobile device, wherein the accelerometer data is associated with ambulatory motion;

input relative to WiFi states of the mobile device, wherein the WiFI states are associated with general user motion; and thereupon using a rules table to determine a transition between ambulatory motion of the user of the mobile device and driving of the vehicle; and using the module to report the parking event to the parking server.

2. The method according to claim 1, wherein said detecting of a parking event comprises detecting an act of parking the vehicle.

3. The method according to claim 2, wherein said detecting of an act of parking comprises detecting a transition from driving of the vehicle to ambulatory motion of a user of the mobile device.

4. The method according to claim 1, wherein said detecting of a parking event comprises detecting an act of un-parking the vehicle.

5. The method according to claim 4, wherein said detecting of an act of un-parking comprises detecting a transition from ambulatory motion of a user of the mobile device to driving of the vehicle.

6. The method according to claim 1, wherein said reporting comprises sending data to a localization server to compute a location of the vehicle within the parking facility.

7. The method according to claim 6, wherein said reporting comprises using the module to send data to the parking server to indicate the computed vehicle location as occupied.

8. The method according to claim 6, wherein said reporting comprises using the module to send data to the parking server to indicate the computed vehicle location as occupied.

9. The method according to claim 1, wherein:

the module comprises an application installed at the mobile device.

10. An apparatus for parking events within an indoor parking facility, said apparatus comprising:

at least one processor; and a computer readable storage medium having computer readable program code embodied therewith and executable by the at least one processor, the computer readable program code comprising:

computer readable program code configured to use a module of a mobile device to communicate, to a parking server which stores global data relative to parking places in the indoor parking facility, a presence of a vehicle in the indoor parking facility;

computer readable program code configured to receive, via the module, an indication from the parking server of one or more occupied and/or unoccupied parking places in the indoor parking facility;

computer readable program code configured to use the module to detect a parking event of the vehicle relative to one of the one or more occupied and/or unoccupied parking places, wherein said code configured to detect the parking event comprises code configured to detect a transition between ambulatory motion of a user of the mobile device and driving of the vehicle via:

receiving and synchronizing:

accelerometer data of the mobile device, wherein the accelerometer data is associated with ambulatory motion;

input relative to WiFi states of the mobile device, wherein the WiFI states are associated with general user motion; and thereupon using a rules table to determine a transition between ambulatory motion of the user of the mobile device and driving of the vehicle; and computer readable program code configured to use the module to report the parking event to the parking server.

11. A computer program product for parking events within an indoor parking facility, said computer program product comprising:

a computer readable storage medium having computer readable program code embodied therewith, the computer readable program code comprising:

computer readable program code configured to use a module of a mobile device to communicate, to a parking server which stores global data relative to parking places in the indoor parking facility, a presence of a vehicle in the indoor parking facility;

computer readable program code configured to receive, via the module, an indication from the parking server of one or more occupied and/or unoccupied parking places in the indoor parking facility;

computer readable program code configured to use the module to detect a parking event of the vehicle relative to one of the one or more occupied and/or unoccupied parking places, wherein said code configured to detect the parking event comprises code configured to detect a transition between ambulatory motion of a user of the mobile device and driving of the vehicle via:

receiving and synchronizing:

accelerometer data of the mobile device, wherein the accelerometer data is associated with ambulatory motion;

input relative to WiFi states of the mobile device, wherein the WiFI states are associated with general user motion; and thereupon using a rules table to determine a transition between ambulatory motion of the user of the mobile device and driving of the vehicle; and computer readable program code configured to use the module to report the parking event to the parking server.

12. The computer program product according to claim 11, wherein the detecting of a parking event comprises detecting an act of parking the vehicle.

13. The computer program product according to claim 12, wherein the detecting of an act of parking comprises detecting a transition from driving of the vehicle to ambulatory motion of a user of the mobile device.

14. The computer program product according to claim 11, wherein the detecting of a parking event comprises detecting an act of un-parking the vehicle.

15. The computer program product according to claim 14, wherein the detecting of an act of un-parking comprises detecting a transition from ambulatory motion of a user of the mobile device to driving of the vehicle.

16. The computer program product according to claim 11, wherein the reporting comprises sending data to a localization server to compute a location of the vehicle within the parking facility.

17. The computer program product according to claim 16, wherein the reporting comprises using the module to send data to the parking server to indicate the computed vehicle location as occupied.

18. The computer program product according to claim 16, wherein the reporting comprises using the module to send data to the parking server to indicate the computed vehicle location as occupied.

19. The computer program product according to claim 11, wherein:

the module comprises an application installed at the mobile device.

20. A method comprising:

receiving, at a parking server which stores global data relative to parking places in an indoor parking facility, a communication from a mobile device to indicate presence of a vehicle in the indoor parking facility, a module comprising an application installed at the mobile device;

communicating, to the mobile device, an indication of one or more occupied and/or unoccupied spaces in the indoor parking facility;

receiving, from the mobile device, data relative to detected parking events at one or more computed locations of the vehicle within the indoor parking facility, via:

receiving a communication, from the mobile device, relative to a detected transition between driving of the vehicle and ambulatory motion of a user of the mobile device; and receiving a communication, from the mobile device, relative to a detected transition between ambulatory motion of the user of the mobile device and driving of the vehicle;

wherein said detecting of the transition comprises detecting via:

receiving and synchronizing:

accelerometer data of the mobile device, wherein the accelerometer data is associated with ambulatory motion;

input relative to WiFi states of the mobile device, wherein the WiFI states are associated with general user motion; and thereupon using a rules table to determine a transition between ambulatory motion of the user of the mobile device and driving of the vehicle.

* * * * *